United States Patent
Sung

(10) Patent No.: US 11,584,381 B2
(45) Date of Patent: Feb. 21, 2023

(54) APPARATUS AND METHOD FOR CONTROLLING ARTICULATION OF ARTICULATED VEHICLE

(71) Applicants: HYUNDAI MOTOR COMPANY, Seoul (KR); KIA MOTORS CORPORATION, Seoul (KR)

(72) Inventor: Byung Jun Sung, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 190 days.

(21) Appl. No.: 17/089,716

(22) Filed: Nov. 4, 2020

(65) Prior Publication Data

US 2021/0387630 A1     Dec. 16, 2021

(30) Foreign Application Priority Data

Jun. 16, 2020  (KR) .......................... 10-2020-0073001

(51) Int. Cl.
*B60W 40/114*   (2012.01)
*B62D 47/02*   (2006.01)
*B60W 10/20*   (2006.01)

(52) U.S. Cl.
CPC .......... *B60W 40/114* (2013.01); *B60W 10/20* (2013.01); *B62D 47/025* (2013.01);
(Continued)

(58) Field of Classification Search
CPC ............... B60W 40/114; B60W 10/20; B60W 2520/10; B60W 2520/14; B60W 2520/18; B60W 2720/14; B62D 47/025
See application file for complete search history.

(56) References Cited

U.S. PATENT DOCUMENTS

| 9,950,703 B2* | 4/2018 | Lee .................. B60W 10/18 |
| 2006/0103511 A1* | 5/2006 | Lee .................. B62D 5/008 |
| | | 340/431 |
| 2006/0229782 A1* | 10/2006 | Deng .................. B62D 6/003 |
| | | 180/443 |

FOREIGN PATENT DOCUMENTS

| CN | 106985813 A | * | 7/2017 | ............ B60W 30/02 |
| CN | 110901630 A | * | 3/2020 | ............ B60W 30/02 |

OTHER PUBLICATIONS

Machine translation of CN-110901630-A (Year: 2020).*
Machine translation of CN-106985813-A (Year: 2017).*

* cited by examiner

*Primary Examiner* — Jeff A Burke
*Assistant Examiner* — Mohamad O El Sayah
(74) *Attorney, Agent, or Firm* — McDonnell Boehnen Hulbert & Berghoff LLP

(57) ABSTRACT

Disclosed are an apparatus and method for controlling articulation of an articulated vehicle. The apparatus includes a yaw rate calculator configured to calculate a desired yaw rate based on a steering angle and a speed of the articulated vehicle, a first moment generator configured to generate a yaw rate control moment based on the desired yaw rate and an actual yaw rate of the articulated vehicle, a second moment generator configured to generate a hitch damping control moment based on a hitch angular velocity of the articulated vehicle, an adder configured to output a final moment for controlling the articulation of the articulated vehicle by adding the yaw rate control moment and the hitch damping control moment, and an articulation controller configured to control the articulation of the articulated vehicle based on the final moment.

18 Claims, 8 Drawing Sheets

(52) U.S. Cl.
CPC ..... *B60W 2520/10* (2013.01); *B60W 2520/14* (2013.01); *B60W 2520/18* (2013.01); *B60W 2720/14* (2013.01)

Weight=$f(\theta, \dot{\theta})$

<YAW RATE>

<HITCH ANGLE>

<TORQUE OF ARTICULATED JOINT>

APPARATUS AND METHOD FOR CONTROLLING ARTICULATION OF ARTICULATED VEHICLE

This application claims the benefit of Korean Patent Application No. 10-2020-0073001, filed on Jun. 16, 2020, which is hereby incorporated by reference as if fully set forth herein.

BACKGROUND

Field

The present disclosure relates to an apparatus for controlling articulation of an articulated vehicle, and more particularly, to an apparatus and method for controlling articulation of an articulated vehicle which may prevent jackknifing of the articulated vehicle traveling on a slippery road.

Discussion of the Related Art

In general, articulated vehicles are one mode of transportation that is manufactured so as to be easily bent even on a curved road by connecting two or more vehicle sections by an articulated joint, such as articulated buses, tractor-trailers and trains.

Recently, a pusher-type articulated vehicle, to which a wheel motor axle for electric buses is applied, and in which a rear axle is driven, has been developed.

Such a pusher-type articulated vehicle requires an articulation system for preventing unstable behavior of the vehicle, such as jackknifing.

Jackknifing refers to the folding of a rear vehicle body connected to a front vehicle body of an articulated vehicle towards the front vehicle body due to inertial force so that it resembles the acute angle of a folding pocket knife when the vehicle suddenly brakes on a curved road.

Therefore, the articulation system performs safety control so as to prevent the articulated vehicle from jackknifing through increases and decreases in the damping force of hydraulic equipment, and vehicle power cutoff control depending on a hitch angle between the front vehicle body and the rear vehicle body.

However, in the articulated vehicle, the hitch angle is excessively increased when traveling on a slippery road, and thus jackknifing easily occurs.

Particularly, if folding of the articulated vehicle occurs due to excessive articulation when traveling on a slippery road, an alarm sounds, and then a manual operation of cutting off the power to the articulated vehicle must be performed, thereby causing driver inconvenience.

Therefore, it is desirable to provide an apparatus for controlling articulation of an articulated vehicle, which may prevent jackknifing of the articulated vehicle traveling on a slippery road so as to improve driver convenience and safety.

SUMMARY

Accordingly, the present disclosure is directed to an apparatus and methods for controlling articulation of an articulated vehicle, substantially obviating one or more problems due to limitations and disadvantages of the related art.

An object of the present disclosure is to provide an apparatus and methods for controlling articulation of an articulated vehicle, which may prevent jackknifing of the articulated vehicle traveling on a slippery road by controlling the articulation of the articulated vehicle based on a yaw rate control moment corresponding to the steering angle and the speed of the articulated vehicle, and a hitch damping control moment corresponding to the hitch angular velocity of the articulated vehicle, thus improving driver convenience and safety.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, an apparatus for controlling articulation of an articulated vehicle includes a yaw rate calculator configured to calculate a desired yaw rate based on a steering angle and a speed of the articulated vehicle, a first moment generator configured to generate a yaw rate control moment based on an error between the desired yaw rate and an actual yaw rate of the articulated vehicle, a second moment generator configured to generate a hitch damping control moment based on a hitch angular velocity of the articulated vehicle, an adder configured to output a final moment for controlling the articulation of the articulated vehicle by adding the yaw rate control moment and the hitch damping control moment, and an articulation controller configured to control the articulation of the articulated vehicle based on the final moment.

In another aspect of the present disclosure, a method for controlling articulation of an articulated vehicle in an apparatus, the apparatus including a processor for controlling the articulation, includes confirming, by the processor, whether or not a steering angle and a speed of the articulated vehicle are input, calculating, by the processor, a desired yaw rate based on the steering angle and the speed of the articulated vehicle when the steering angle and the speed of the articulated vehicle are input, generating, by the processor, a yaw rate control moment based on an error between the desired yaw rate and an actual yaw rate of the articulated vehicle, generating, by the processor, a hitch damping control moment based on a hitch angular velocity of the articulated vehicle, outputting, by the processor, a final moment for controlling the articulation of the articulated vehicle by adding the yaw rate control moment and the hitch damping control moment, and controlling, by the processor, the articulation of the articulated vehicle based on the final moment.

In yet another aspect of the present disclosure, a computer readable recording medium, in which a program for executing the method for controlling the articulation of the articulated vehicle in the apparatus for controlling the articulation of the articulated vehicle is recorded, executes a process provided by the method for controlling the articulation of the articulated vehicle.

In still yet another aspect of the present disclosure, an articulated vehicle includes a sensing device configured to sense a steering angle and a speed of the articulated vehicle, and an apparatus for controlling the articulation of the articulated vehicle based on the sensed steering angle and speed of the articulated vehicle, wherein the apparatus calculates a desired yaw rate based on the steering angle and the speed of the articulated vehicle, generates a yaw rate control moment based on an error between the desired yaw rate and an actual yaw rate of the articulated vehicle, generates a hitch damping control moment based on a hitch angular velocity of the articulated vehicle, outputs a final moment for controlling the articulation of the articulated vehicle by adding the yaw rate control moment and the hitch damping control moment, and controls the articulation of the articulated vehicle based on the final moment.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
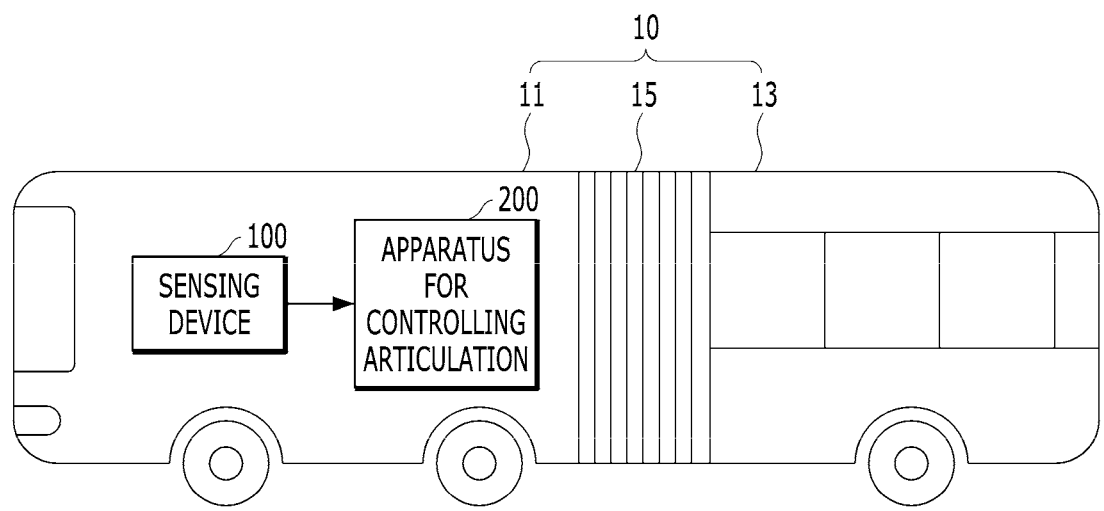
FIG. 1 is a view illustrating an articulated vehicle in which an apparatus for controlling articulation of an articulated vehicle according to one embodiment of the present disclosure is mounted.

Reference will now be made in detail to the preferred embodiments of the present disclosure, examples of which are illustrated in the accompanying drawings. However, the disclosure of the disclosure is not limited to the embodiments set forth herein, and may be variously modified. In the drawings, in order to clearly describe the present disclosure, descriptions of elements which are not related to the present disclosure will be omitted, and the same or similar elements are denoted by the same reference numerals even when they are depicted in different drawings.

In the following description of the embodiments, it will be understood that, when a part is said to "include" an element, the part may further include other elements and does not exclude the presence of such other elements, unless stated otherwise. Further, in the following description of the embodiments, it will be understood that the suffixes "part", "unit," and "module" indicate units for processing at least one function or operation, and may be implemented using hardware, software, or a combination of hardware and software.

Hereinafter, with reference to FIGS. 1 to 10, an apparatus and method for controlling articulation of an articulated vehicle, which are applicable to the embodiments of the present disclosure, will be described in detail.

FIG. 1 is a view illustrating an articulated vehicle in which an apparatus for controlling articulation of an articulated vehicle according to one embodiment of the present disclosure is mounted.

As shown in FIG. 1, an articulated vehicle 10 according to the present disclosure may include a front vehicle body 11 which is a tractor, a rear vehicle body 13 which is a trailer, and an articulated joint 15 configured to connect the front vehicle body 11 and the rear vehicle body 13 so as to be articulated.

That is, the articulated vehicle 10 according to the present disclosure is applicable to various kinds of vehicles in which two or more vehicle sections are connected, such as articulated buses, tractor-trailers and trains.

The articulated vehicle 10 according to the present disclosure may include a sensing device 100 configured to sense the steering angle and the speed of the articulated vehicle 10, and an apparatus 200 for controlling the articulation of the articulated vehicle 10 based on the sensed steering angle and speed.

Here, the apparatus 200 may calculate a desired yaw rate based on the steering angle and the speed of the articulated vehicle 10, generate a yaw rate control moment based on an error between the desired yaw rate and the actual yaw rate of the articulated vehicle 10, generate a hitch damping control moment based on the hitch angular velocity of the articulated vehicle 10, output a final moment for controlling the articulation of the articulated vehicle 10 by adding the yaw rate control moment and the hitch damping control moment, and control the articulation of the articulated vehicle 10 based on the final moment.

That is, the apparatus 200 may be a safety assistance control apparatus which may independently control left and right wheel motors of the articulated vehicle 10 so as to stably control the articulation of the articulated vehicle 10 travelling on a slippery road.

In the calculation of the desired yaw rate, the apparatus 200 may calculate the desired yaw rate in consideration of the steady state of the articulated vehicle 10.

Further, the apparatus 200 may receive the wheel steering angle of the front vehicle body 11 and then calculate the desired yaw rate, if the articulated vehicle 10 includes the front vehicle body 11 and at least one rear vehicle body 13 connected to the front vehicle body 11.

Further, in the generation of the yaw rate control moment, the apparatus 200 may calculate the error between the desired yaw rate and the actual yaw rate of the articulated vehicle 10, generate a yaw moment based on the error, generate a first weight for moment distribution, and output the yaw rate control moment calculated by multiplying the yaw moment by the first weight.

Here, in the generation of the yaw moment, when the error between the desired yaw rate and the actual yaw rate of the articulated vehicle 10 is input, the apparatus 200 may generate the yaw moment by performing proportional-integral control based on the error.

Further, in the generation of the first weight, the apparatus 200 may set a weight within the range of 0 to 1 based on the hitch angle and the hitch angular velocity of the articulated vehicle 10, and generate the first weight for moment distribution based on the set weight.

Here, the weight may be set to a function of the hitch angle and the hitch angular velocity of the articulated vehicle 10, and the first weight for moment distribution may be calculated using the Equation expressed as First Weight=1−Weight (here, the weight is within the range of 0 to 1).

Further, in the generation of the hitch damping control moment, when the hitch angular velocity of the articulated vehicle 10 is input, the apparatus 200 may amplify a signal corresponding to the hitch angular velocity, generate a second weight for moment distribution, and output the hitch damping control moment by multiplying an amplified signal output value by the second weight.

Here, in the generation of the second weight, the apparatus 200 may set a weight within the range of 0 to 1 based on the hitch angle and the hitch angular velocity of the articulated vehicle 10, and generate the second weight for moment distribution based on the set weight.

Here, the weight may be set to a function of the hitch angle and the hitch angular velocity of the articulated vehicle 10, and the second weight for moment distribution may be equal to the set weight (in the present embodiment, the weight is within the range of 0 to 1).

Further, in the control of the articulation of the articulated vehicle 10, when the final moment is input, the apparatus 200 may distribute the input final moment to each of a left wheel motor and a right wheel motor of the rear vehicle body 13 of the articulated vehicle 10 so as to control wheel motor torques of the rear vehicle body 13 of the articulated vehicle 10, thereby stably controlling the articulation of the articulated vehicle 10 when driven backwards.

As such, in the present disclosure, the articulation of the articulated vehicle 10 may be controlled based on the yaw rate control moment corresponding to the steering angle and the speed of the articulated vehicle 10 and the hitch damping control moment corresponding to the hitch angular velocity of the articulated vehicle 10, thereby preventing jackknifing of the articulated vehicle 10 travelling on a slippery road and thus being capable of improving driver convenience and safety.

Further, even when the articulated vehicle 10 is in an unstable state, the posture of the articulated vehicle 10 is controlled using the wheel motors, and thereby, jackknifing of the articulated vehicle 10 may be prevented and thus the marketability of the articulated vehicle 10 may be increased due to improved driving stability and safety function.

Figure 2:
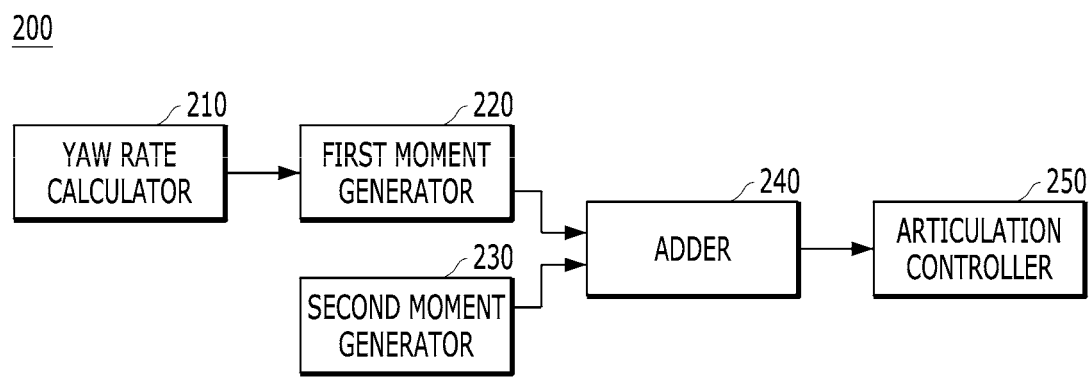
FIG. 2 is a block diagram illustrating the apparatus according to one embodiment of the present disclosure.

FIG. 2 is a block diagram illustrating the apparatus according to one embodiment of the present disclosure.

As shown in FIG. 2, the apparatus 200 according to the present disclosure is an apparatus which prevents jackknifing of an articulated vehicle traveling on a slippery road using torque vectoring of wheel motors, and may include a yaw rate calculator 210, a first moment generator 220, a second moment generator 230, an adder 240, and an articulation controller 250.

Here, the yaw rate calculator 210 may calculate the desired yaw rate based on the steering angle and the speed of the articulated vehicle.

If the articulated vehicle includes a front vehicle body and at least one rear vehicle body connected to the front vehicle body, the yaw rate calculator 210 may receive the wheel steering angle of the front vehicle body, and then calculate the desired yaw rate.

Further, the yaw rate calculator 210 may calculate the desired yaw rate based on a dynamic tractor-trailer vehicle model in consideration of the steady state of the articulated vehicle.

For example, the yaw rate calculator 210 may calculate the desired yaw rate using the following Equation.

$$\omega_{ref} = \frac{V_x}{l_1 + [K_u - \Delta K_u]V_x^2}\delta_{cmd} = \frac{V_x}{l_1 + \left[\frac{M_1(C_{ar}b_1 - C_{af}a_1)}{C_{af}C_{ar}l_1} - \frac{M_2b_2[C_{af}(a_1+c_1) + C_{ar}(c_1-b_1)]}{C_{af}C_{ar}l_1l_2}\right]V_x^2}\delta_{cmd}$$

Here, $\omega_{ref}$ may be the desired yaw rate, $\delta_{cmd}$ may be the steering angle based on a driver's steering command, $V_x$ may be the speed of the articulated vehicle, $M_1$ may be the weight of the tractor of an articulated vehicle, $M_2$ may be the weight of the trailer of the articulated vehicle, $a_1$ may be the distance from the center of gravity of the tractor to a front axle thereof, $b_1$ may be the distance from the center of gravity of the tractor to a rear axle thereof, $c_1$ may be the distance from the center of gravity of the tractor to a hitch point, $a_2$ may be the distance from the center of gravity of the trailer to the hitch point, $b_2$ may be the distance from the center of gravity of the trailer to a trailer axle, $C_{af}$ may be the cornering stiffness of front tires of the tractor, $C_{ar}$ may be the cornering stiffness of rear tires of the tractor, $C_{at}$ may be the cornering stiffness of tires of the trailer, $l_1$ may be $a_1+b_1$, and $l_2$ may be $a_2+b_2$.

The first moment generator 220 may generate the yaw rate control moment based on the error between the desired yaw rate and the actual yaw rate of the articulated vehicle 10.

Here, the first moment generator 220 may calculate the error between the desired yaw rate and the actual yaw rate of the articulated vehicle 10, generate the yaw moment based on the error, generate the first weight for moment distribution, and output the yaw rate control moment by multiplying the yaw moment by the first weight.

Here, in the generation of the yaw moment, when the error between the desired yaw rate and the actual yaw rate of the articulated vehicle 10 is input, the first moment generator 220 may generate the yaw moment by performing proportional-integral control based on the error.

Further, in the generation of the first weight, the first moment generator 220 may calculate a weight as a function of the hitch angle and the hitch angular velocity of the articulated vehicle, and generate the first weight for moment distribution by setting the weight to a value which is greater than 0 but is less than 1.

Here, in the calculation of the weight, the first moment generator 220 may calculate the weight as the function of the hitch angle and the hitch angular velocity of the articulated vehicle.

Further, in the calculation of the first weight, the first moment generator 220 may generate the first weight calculated using the Equation expressed as First Weight=1−Weight (here, the weight is a function of the hitch angle and the hitch angular velocity of the articulated vehicle).

Subsequently, the second moment generator 230 may generate the hitch damping control moment based on the hitch angular velocity of the articulated vehicle.

Here, when the hitch angular velocity of the articulated vehicle is input, the second moment generator 230 may amplify a signal corresponding to the hitch angular velocity, generate the second weight for moment distribution, and output the hitch damping control moment by multiplying the output value of the amplified signal by the second weight.

Here, in the generation of the second weight, the second moment generator 230 may calculate the second weight using the function of the hitch angle and the hitch angular velocity of the articulated vehicle.

Next, the adder 240 may output the final moment for controlling the articulation of the articulated vehicle by adding the yaw rate control moment and the hitch damping control moment.

Finally, the articulation controller 250 may control the articulation of the articulated vehicle based on the final moment.

When the final moment is input, the articulation controller 250 may distribute the input final moment to each of a left wheel motor and a right wheel motor of a rear vehicle body of the articulated vehicle so as to control wheel motor torques of the rear vehicle body of the articulated vehicle.

Figure 3:
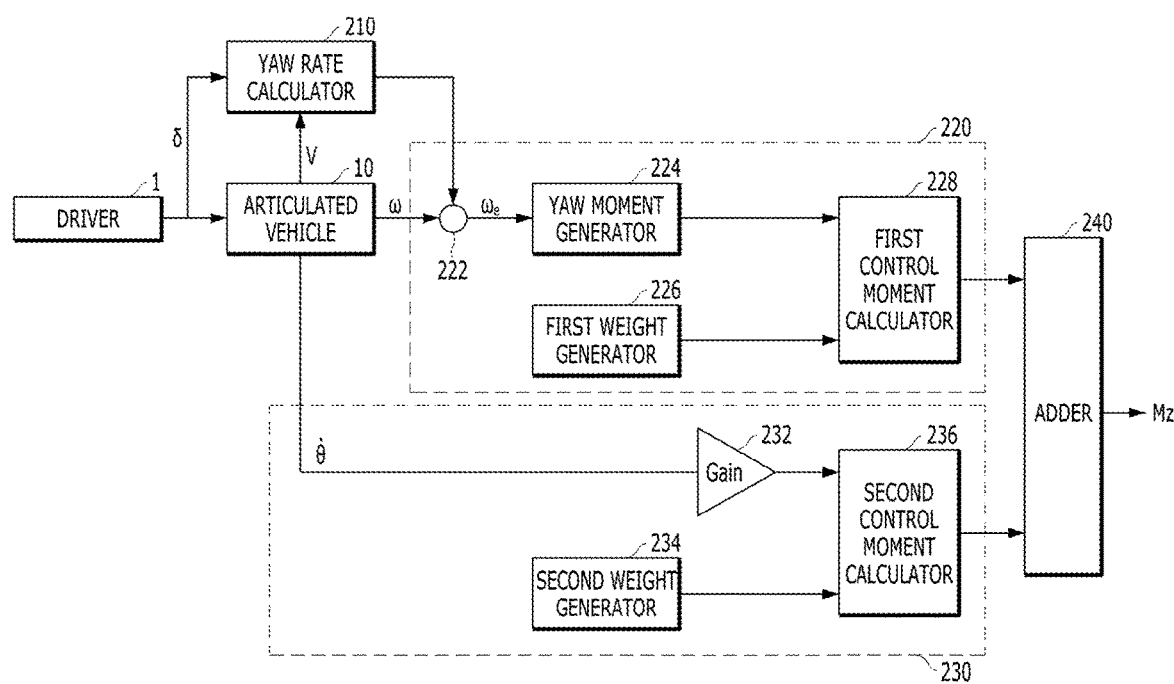
FIG. 3 is a circuit diagram illustrating a process of generating an articulation control moment in the apparatus according to one embodiment of the present disclosure.

FIG. 3 is a circuit diagram illustrating a process of generating an articulation control moment in the apparatus according to one embodiment of the present disclosure.

As shown in FIG. 3, when an articulated vehicle 10 travels on a slippery road according to a command of a driver 1, the yaw rate calculator 210 of the apparatus may receive a sensed speed V from the articulated vehicle 10, and receive a steering angle δ according to a steering command of the driver 1.

Thereafter, the yaw rate calculator 210 may calculate a desired yaw rate $\omega_f$ based on the received steering angle δ and speed V of the articulated vehicle 10.

For example, the yaw rate calculator 210 may calculate the desired yaw rate $\omega_f$ in consideration of the steady state of the articulated vehicle 10 based on the dynamic tractor-trailer vehicle model.

Next, the first moment generator 220 may generate a yaw rate control moment based on an error $\omega_e$ between the desired yaw rate $\omega_f$ and the actual yaw rate ω of the articulated vehicle.

Here, the first moment generator 220 may include an error calculator 222, a yaw moment generator 224, a first weight generator 226, and a first control moment calculator 228.

The error calculator 222 may calculate the error $\omega_e$ between the desired yaw rate $\omega_f$ and the actual yaw rate ω of the articulated vehicle.

For example, the error calculator 222 may include a subtractor, which calculates the error $\omega_e$ between the desired yaw rate $\omega_f$ and the actual yaw rate ω of the articulated vehicle and outputs the calculated error $\omega_e$ to the yaw moment generator 224, without being limited thereto.

Further, the yaw moment generator 224 may generate a yaw moment based on the error.

For example, the yaw moment generator 224 may include a proportional-integral (PI) controller which, when the error $\omega_e$ between the desired yaw rate $\omega_f$ and the actual yaw rate ω of the articulated vehicle are input, generates the yaw moment by performing proportional-integral control based on the error $\omega_e$, without being limited thereto.

Next, the first weight generator 226 may generate the first weight for moment distribution.

In the generation of the first weight, the first weight generator 226 may set a weight within the range of 0 to 1 based on the hitch angle and the hitch angular velocity of the articulated vehicle, and generate the first weight for moment distribution based on the set weight.

Here, the weight may be set to a function of the hitch angle and the hitch angular velocity of the articulated vehicle, and the first weight for moment distribution may be calculated using the Equation expressed as First Weight=1− Weight (here, the weight is within the range of 0 to 1).

Further, the first control moment calculator 228 may output a yaw rate control moment by multiplying the yaw moment by the first weight.

Next, the second moment generator 230 may include an amplifier 232 which, when the hitch angular velocity $\dot{\theta}$ of the articulated vehicle is input, amplifies a signal corresponding to the hitch angular velocity $\dot{\theta}$, a second weight generator 234 which generates the second weight for moment distribution, and a second control moment calculator 236 which outputs the hitch damping control moment calculated by multiplying an output value from the amplifier 232 by the second weight.

Here, in the generation of the second weight, the second weight generator 234 may set a weight within the range of 0 to 1 based on the hitch angle θ and hitch angular velocity $\dot{\theta}$ of the articulated vehicle, and generate the second weight for moment distribution based on the set weight.

The weight may be set to a function of the hitch angle θ and the hitch angular velocity $\dot{\theta}$ of the articulated vehicle, and the second weight for moment distribution may be equal to the set weight (here, the weight is within the range of 0 to 1).

Thereafter, the adder 240 may output the final moment $M_z$ for controlling the articulation of the articulated vehicle by adding the yaw rate control moment and the hitch damping control moment.

Figure 4:
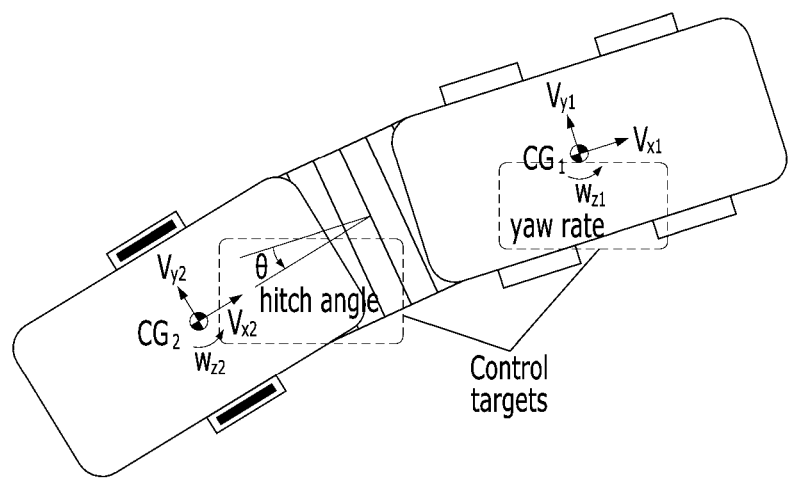
FIGS. 4 and 5 are views illustrating a process of calculating a desired yaw rate in the apparatus.
Figure 5:
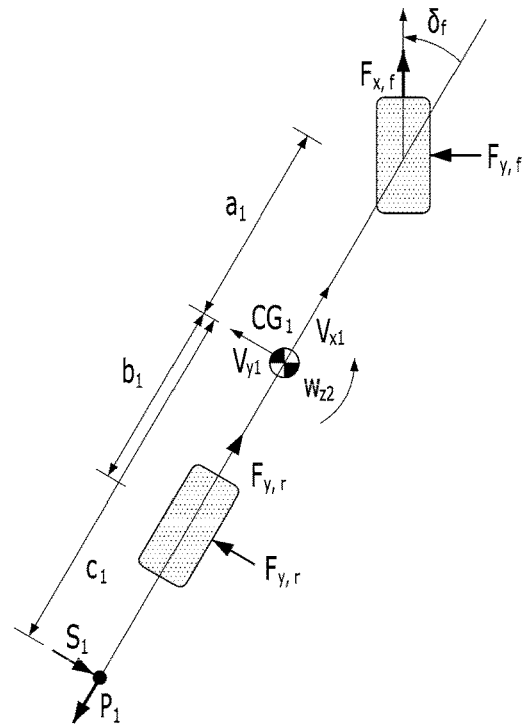
Figure 5:
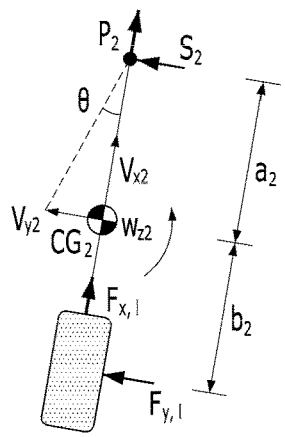

FIGS. 4 and 5 are views illustrating a process of calculating a desired yaw rate in the apparatus.

As shown in FIGS. 4 and 5, the apparatus according to the present disclosure may calculate the desired yaw rate based on the dynamic tractor-trailer vehicle model in consideration of the steady state of an articulated vehicle.

The desired yaw rate may be calculated using the following Equation.

$$\omega_{ref} = \frac{V_x}{l_1 + [K_u - \Delta K_u]V_x^2}\delta_{cmd} = \frac{V_x}{l_1 + \left[\frac{M_1(C_{ar}b_1 - C_{af}a_1)}{C_{af}C_{ar}l_1} - \frac{M_2b_2[C_{af}(a_1+c_1) + C_{ar}(c_1-b_1)]}{C_{af}C_{ar}l_1l_2}\right]V_x^2}\delta_{cmd}$$

Here, $\omega_{ref}$ may be the desired yaw rate, $\delta_{cmd}$ may be the steering angle based on a driver's steering command, $V_x$ may be the speed of the articulated vehicle, $M_1$ may be the weight of the tractor of the articulated vehicle, $M_2$ may be the weight of the trailer of the articulated vehicle, $a_1$ may be the distance from the center of gravity of the tractor to a front axle thereof, $b_1$ may be the distance from the center of gravity of the tractor to a rear axle thereof, $c_1$ may be the distance from the center of gravity of the tractor to a hitch point, $a_2$ may be the distance from the center of gravity of the trailer to the hitch point, $b_2$ may be the distance from the center of gravity of the trailer to a trailer axle, $C_{af}$ may be the cornering stiffness of front tires of the tractor, $C_{ar}$ may be the cornering stiffness of rear tires of the tractor, $C_{at}$ may be the cornering stiffness of tires of the trailer, $l_1$ may be $a_1+b_1$, and $l_2$ may be $a_2+b_2$.

Figure 6:
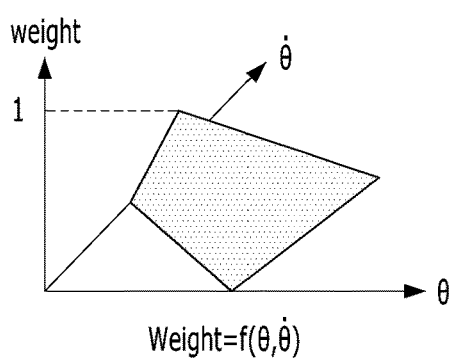
FIG. 6 is a graph illustrating a process of generating a weight in the apparatus.

FIG. 6 is a graph illustrating a process of generating a weight in the apparatus.

As shown in FIG. 6, in the present disclosure, weights may be respectively assigned to the first moment generator configured to generate the yaw rate control moment and the second moment generator configured to generate the hitch damping control moment.

Each weight may be set to a function of the hitch angle and the hitch angular velocity of the articulated vehicle.

That is, the weight may be set to a function $W=f(\theta, \dot{\theta})$, and have a value which is within the range of 0 to 1.

Here, W may indicate the weight, $\theta$ may indicate the hitch angle, and $\dot{\theta}$ may indicate the hitch angular velocity.

Therefore, in the present disclosure, the yaw rate control moment may be generated based on the first weight calculated using the Equation expressed as First Weight=1−Weight (here, the weight is within the range of 0 to 1), and the hitch damping control moment may be generated based on the second weight equal to the set weight.

That is, in the present disclosure, when the hitch angle and the hitch angular velocity of the articulated vehicle increase, the weight for the hitch damping control moment may be increased, and, when the hitch angle and the hitch angular velocity of the articulated vehicle decrease, the weight for the yaw rate control moment may be increased.

Figure 7:
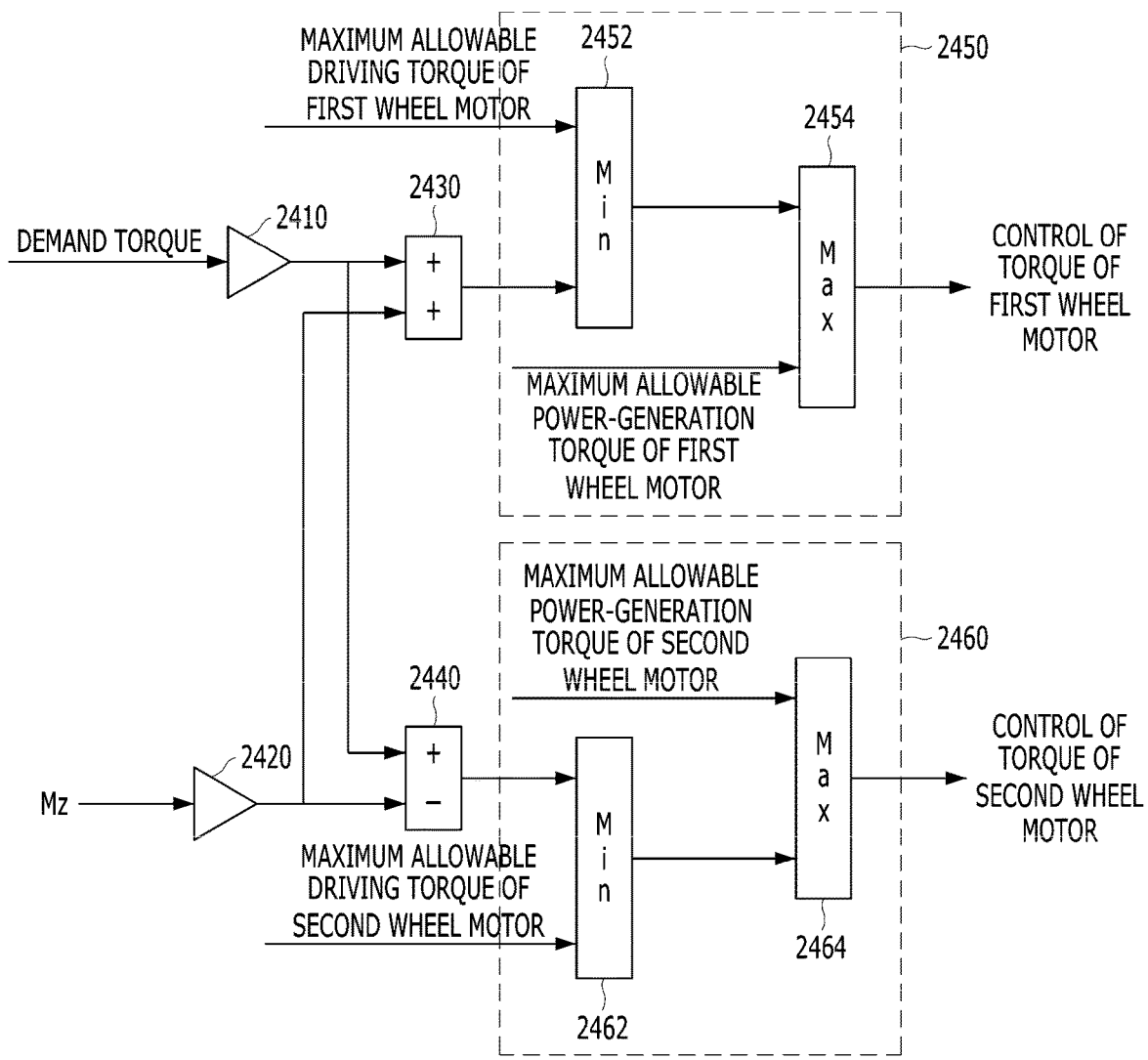
FIG. 7 is a circuit diagram illustrating an articulation controller of the apparatus.

FIG. 7 is a circuit diagram illustrating the articulation controller of the apparatus.

As shown in FIG. 7, when the final moment $M_z$ is input, the articulation controller may distribute the input final moment $M_z$ to each of a left wheel motor and a right wheel motor of the rear vehicle body of the articulated vehicle so as to control wheel motor torques of the rear vehicle body of the articulated vehicle.

For example, the articulation controller may include first and second amplifiers 2410 and 2420, an adder 2430, a subtractor 2440, a first wheel motor torque controller 2450, and a second wheel motor torque controller 2460.

Here, the first amplifier 2410 may amplify a signal corresponding to an input demand torque, and the second amplifier 2420 may amplify a signal corresponding to the final moment $M_z$.

Further, the adder 2430 may add output values from the first and second amplifiers 2410 and 2420, and the subtractor 2440 may subtract the output values from the first and second amplifiers 2410 and 2420.

Thereafter, the first wheel motor torque controller 2450 may calculate a first torque control value based on an output value from the adder 2430 and the torque limit value of a first wheel motor and thus control the torque of the first wheel motor, and the second wheel motor torque controller 2460 may calculate a second torque control value based on an output value from the subtractor 2440 and the torque limit value of a second wheel motor, and thus control the torque of the second wheel motor.

For example, when the demand torque calculated based on an accelerator pedal sensor and a vehicle speed is input, the first amplifier 2410 may amplify the input demand torque.

Further, the first wheel motor torque controller 2450 may include a first calculator 2452 which, when an output value from the adder 2430 and the maximum allowable driving torque (+) corresponding to the first wheel motor are input, calculates and outputs a torque value less than the maximum allowable driving torque (+), and a second calculator 2454 which, when the torque value of the first calculator 2452 and the maximum allowable power-generation torque (−) corresponding to the first wheel motor are input, calculates and outputs a torque value less than the maximum allowable power-generation torque (−).

In addition, the second wheel motor torque controller 2460 may include a third calculator 2462 which, when an output value from the subtractor 2440 and the maximum allowable driving torque (+) corresponding to the second wheel motor are input, calculates and outputs a torque value less than the maximum allowable driving torque (+), and a fourth calculator 2464 which, when the torque value of the third calculator 2462 and the maximum allowable power-generation torque (−) corresponding to the second wheel motor are input, calculates and outputs a torque value less than the maximum allowable power-generation torque (−).

Figure 8A:
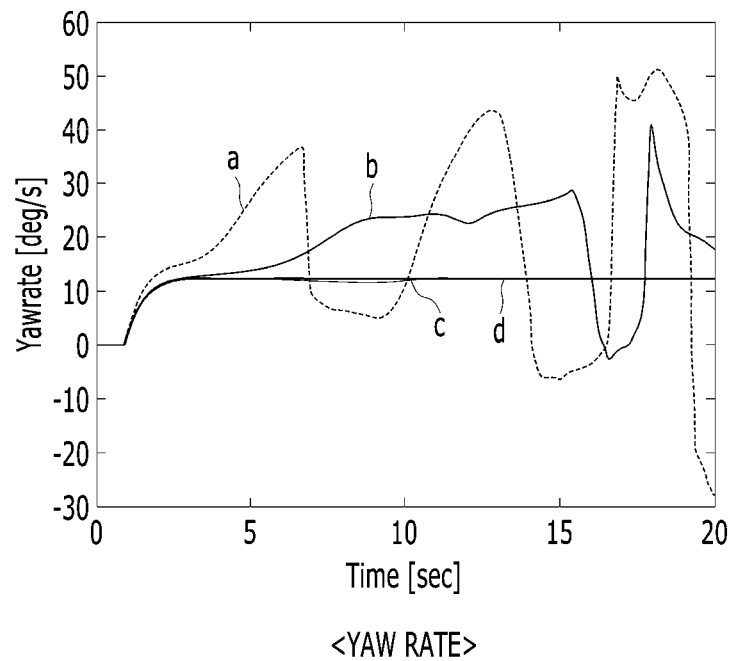
FIGS. 8A to 8C are graphs for comparatively describing articulation control over articulated vehicles traveling on a slippery road depending on whether or not articulation control is performed.
Figure 8B:
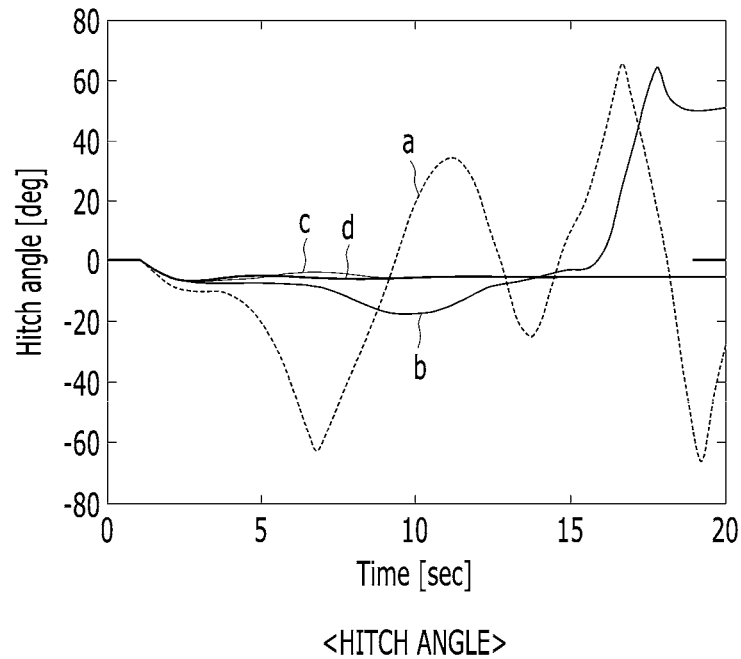
Figure 8C:
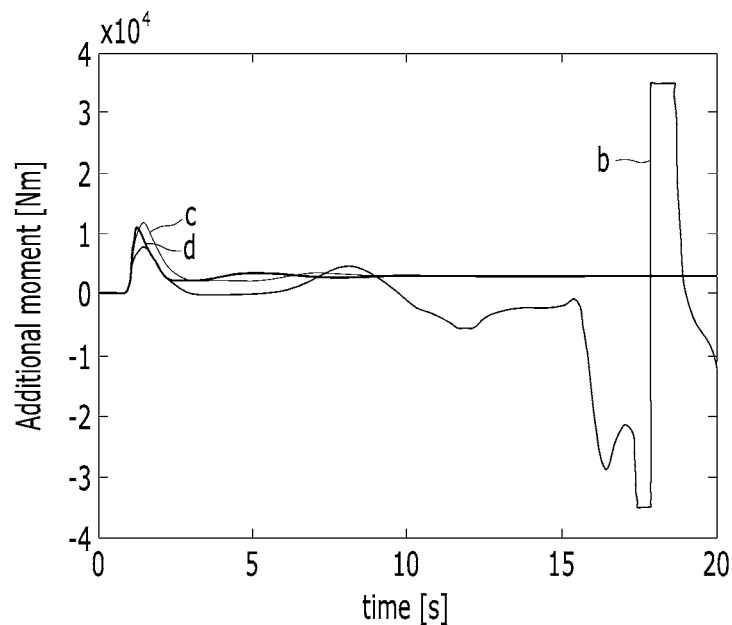

FIGS. 8A to 8C are graphs for comparatively describing articulation control over articulated vehicles traveling on a slippery road depending on whether or not articulation control is performed.

FIG. 8A is a graph showing the yaw rates of the articulated vehicles, FIG. 8B is a graph showing the hitch angles of the articulated vehicles, and FIG. 8C is a graph showing the moments of the articulated joints of the articulated vehicles.

As shown in FIGS. 8A to 8C, when the steering angles of the articulated vehicles traveling on the slippery road are about 4.5 degrees and the speeds thereof are about 50 kph, among the articulated vehicles a and b in which articulation control is not performed, jackknifing of the articulated vehicle a having no articulation system may occur from the beginning of steering, and jackknifing of the articulated vehicle b having an articulation system may occur in the middle of steering.

Further, among the articulated vehicles c and d in which articulation control according to the present disclosure is performed, the articulated vehicle c having no articulation system stably maintains the hitch angle thereof and does not slip and thus jackknifing thereof does not occur, and the articulated vehicle d having an articulation system most stably travels and thus jackknifing thereof does not occur.

Figure 9:
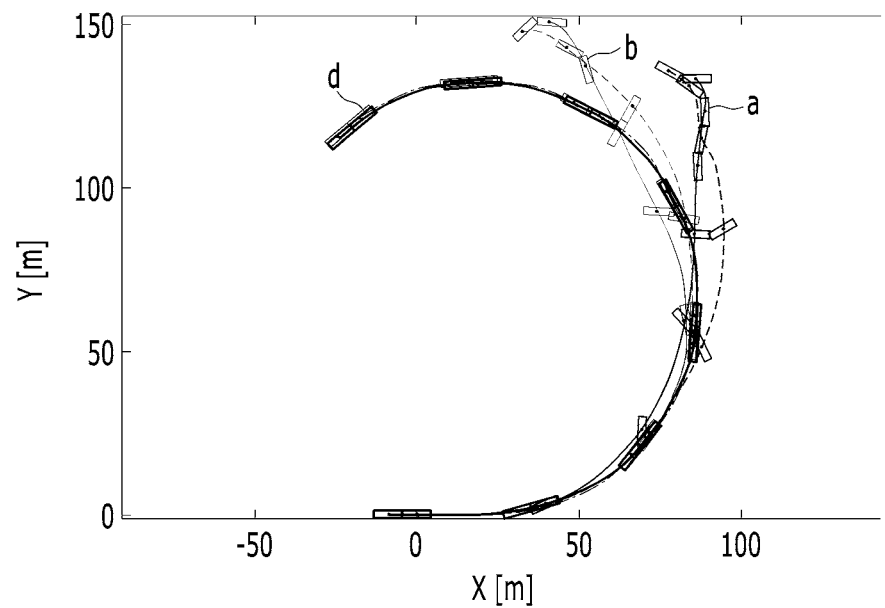
FIG. 9 is a graph for comparatively describing the trajectories of the articulated vehicles traveling on the slippery road depending on whether or not articulation control is performed.

FIG. 9 is a graph comparing trajectories of the articulated vehicles traveling on the slippery road depending on whether or not articulation control is performed.

As shown in FIG. 9, it may be confirmed that, when the steering angles of the articulated vehicles traveling on the slippery road are about 4.5 degrees and the speeds thereof are about 50 kph, among the articulated vehicles a and b in which articulation control is not performed, jackknifing of the articulated vehicle a having no articulation system may occur from the beginning of steering, and jackknifing of the articulated vehicle b having the articulation system may occur in the middle of steering.

Further, it may be confirmed that the articulated vehicle d having an articulation system, in which articulation control according to the present disclosure is performed, most stably travels and thus jackknifing thereof does not occur.

Therefore, in the present disclosure, even when the articulated vehicle is in the unstable state, the posture of the articulated vehicle is controlled using the wheel motors, and thereby, jackknifing of the articulated vehicle may be prevented and thus the marketability of the articulated vehicle may be increased due to improved driving stability and safety function.

Figure 10:
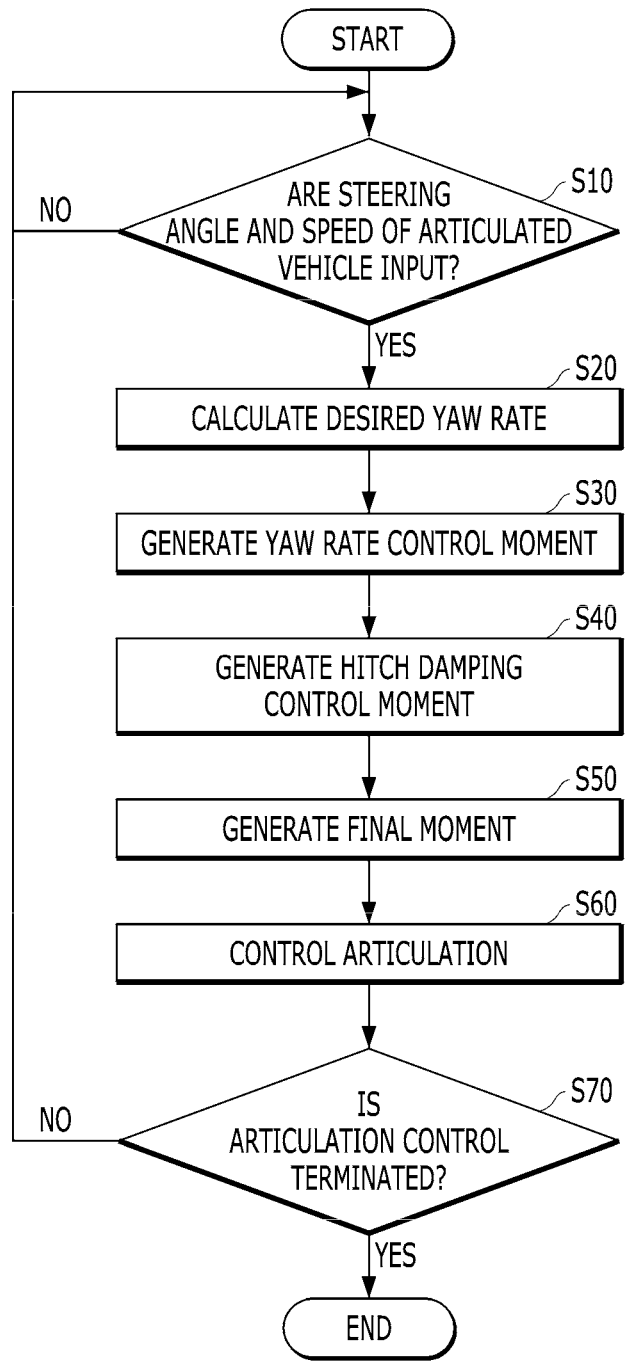
FIG. 10 is a flowchart illustrating a method for controlling articulation of an articulated vehicle in the apparatus according to one embodiment of the present disclosure.

FIG. 10 is a flowchart illustrating a method for controlling articulation of an articulated vehicle in the apparatus according to one embodiment of the present disclosure.

As shown in FIG. 10, the apparatus according to the present disclosure may include a processor configured to control articulation of an articulated vehicle.

Here, the process may include the elements shown in FIG. 2, without being limited thereto.

First, the processor may confirm whether or not the steering angle and the speed of the articulated vehicle are input (S10).

Thereafter, when the steering angle and the speed of the articulated vehicle are input, the processor may calculate a desired yaw rate based on the steering angle and the speed of the articulated vehicle (S20).

Here, the processor may calculate the desired yaw rate based on a dynamic tractor-trailer vehicle model in consideration of the steady state of the articulated vehicle.

Thereafter, the processor may generate a yaw rate control moment based on an error between the desired yaw rate and the actual yaw rate of the articulated vehicle (S30).

Here, the processor may calculate the error between the desired yaw rate and the actual yaw rate of the articulated vehicle, generate the yaw moment based on the error, generate a first weight for moment distribution, and output the yaw rate control moment by multiplying the yaw moment by the first weight.

Here, the processor may set a weight within the range of 0 to 1 based on the hitch angle and the hitch angular velocity of the articulated vehicle, and generate the first weight for moment distribution based on the set weight.

For example, the weight may be set to a function of the hitch angle and the hitch angular velocity of the articulated vehicle, and the first weight for moment distribution may be calculated using the Equation expressed as First Weight=1−Weight (here, the weight is within the range of 0 to 1).

Thereafter, the processor may generate a hitch damping control moment based on the hitch angular velocity of the articulated vehicle (S40).

Here, when the hitch angular velocity of the articulated vehicle is input, the processor may amplify a signal corresponding to the hitch angular velocity, generate a second weight for moment distribution, and output the hitch damping control moment by multiplying the output value of the amplified signal by the second weight.

Here, the processor may set a weight within the range of 0 to 1 based on the hitch angle and the hitch angular velocity of the articulated vehicle, and generate the second weight for moment distribution based on the set weight.

For example, the weight may be set to a function of the hitch angle and the hitch angular velocity of the articulated vehicle, and the second weight for moment distribution may be equal to the set weight (here, the weight is within the range of 0 to 1).

Thereafter, the processor may generate a final moment for controlling the articulation of the articulated vehicle by adding the yaw rate control moment and the hitch damping control moment (S50).

Subsequently, the processor may control the articulation of the articulated vehicle based on the final moment (S60).

Here, when the final moment is input, the processor may distribute the input final moment to each of a left wheel motor and a right wheel motor of a rear vehicle body of the articulated vehicle so as to control wheel motor torques of the rear vehicle body of the articulated vehicle.

For example, in the control of the articulation of the articulated vehicle, the processor may respectively amplify and output a first signal corresponding to a moment and a second signal corresponding to an input demand torque, add and subtract the output values of the amplified first and second signals, calculate a first torque control value based on an output value, acquired by adding the amplified first and second signals, and the torque limit value of the first wheel motor and then control the torque of the first wheel motor based on the calculated first torque control value, and calculate a second torque control value based on an output value, acquired by subtracting the amplified first and second signals, and the torque limit value of the second wheel motor and then control the torque of the second wheel motor based on the calculated second torque control value.

Here, in the control of the torque of the first wheel motor, when the output value, acquired by adding the amplified first and second signals, and the maximum allowable driving torque (+) corresponding to the first wheel motor are input, the processor calculates and outputs a torque value less than the maximum allowable driving torque (+), and, when the torque value less than the maximum allowable driving torque (+) and the maximum allowable power-generation torque (−) corresponding to the first wheel motor are input, the processor calculates and outputs a torque value less than the maximum allowable power-generation torque (−).

Further, in the control of the torque of the second wheel motor, when the output value, acquired by subtracting the amplified first and second signals, and the maximum allowable driving torque (+) corresponding to the second wheel motor are input, the processor calculates and outputs a torque value less than the maximum allowable driving torque and, when the torque value less than the maximum allowable driving torque (+) and the maximum allowable power-generation torque (−) corresponding to the second wheel motor are input, the processor calculates and outputs a torque value less than the maximum allowable power-generation torque (−).

Thereafter, the processor may confirm whether or not articulation control is terminated (S70), and terminate the above-described process for controlling the articulation of the articulated vehicle upon confirming that articulation control is terminated.

As such, in the present disclosure, articulation of an articulated vehicle is controlled based on a yaw rate control moment corresponding to the steering angle and the speed of the articulated vehicle and a hitch damping control moment corresponding to the hitch angular velocity of the articulated vehicle, thereby preventing jackknifing of the articulated vehicle traveling on a slippery road and thus improving driver's convenience and safety.

Further, in the present disclosure, even when the articulated vehicle is in an unstable state, the posture of the articulated vehicle is controlled using wheel motors, thereby preventing jackknifing of the articulated vehicle and thus increasing the marketability of the articulated vehicle due to improved driving stability and safety function.

In addition, in the present disclosure, a computer readable recording medium, in which a program for executing the method for controlling the articulation of the articulated vehicle in the apparatus for controlling the articulation of the articulated vehicle according to one embodiment of the present disclosure is recorded, may execute a process provided by the method for controlling the articulation of the articulated vehicle.

The present disclosure may be implemented as computer readable code in a computer readable recording medium in which programs are recorded. Such computer readable recording media may include all kinds of recording media in which data readable by computer systems is stored. For example, the computer readable recording media may include a hard disk drive (HDD), a solid state disk (SSD), a silicon disk drive (SDD), a ROM, a RAM, a CD-ROM, a magnetic tape, a floppy disk, an optical data storage device, and the like.

As is apparent from the above description, in an apparatus and method for controlling articulation of an articulated vehicle according to at least one embodiment of the present disclosure, the articulation of the articulated vehicle is controlled based on a yaw rate control moment corresponding to the steering angle and the speed of the articulated vehicle and a hitch damping control moment corresponding to the hitch angular velocity of the articulated vehicle, thereby preventing jackknifing of the articulated vehicle traveling on a slippery road and thus improving driver's convenience and safety.

Further, even when the articulated vehicle is in an unstable state, the posture of the articulated vehicle is controlled using wheel motors, thereby preventing jackknifing of the articulated vehicle and thus increasing the marketability of the articulated vehicle due to improved driving stability and safety functionality.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. An apparatus for controlling articulation of an articulated vehicle, comprising:
    a yaw rate calculator configured to calculate a desired yaw rate based on a steering angle and a speed of the articulated vehicle;
    a first moment generator configured to generate a yaw rate control moment based on an error between the desired yaw rate and an actual yaw rate of the articulated vehicle;
    a second moment generator configured to generate a hitch damping control moment based on a hitch angular velocity of the articulated vehicle;
    an adder configured to output a final moment for controlling the articulation of the articulated vehicle by adding the yaw rate control moment and the hitch damping control moment; and
    an articulation controller configured to control the articulation of the articulated vehicle based on the final moment,
    wherein the articulation controller comprises:
    a first amplifier configured to amplify a signal corresponding to an input demand torque;
    a second amplifier configured to amplify a signal corresponding to the final moment
    an adder configured to add output values from the first and second amplifiers;
    a subtractor configured to subtract the output values from the first and the second amplifiers;
    a first wheel motor torque controller configured to calculate a first torque control value based on an output value from the adder and a torque limit value of a first wheel motor and to control a torque of the first wheel motor based on the first torque control value; and
    a second wheel motor torque controller configured to calculate a second torque control value based on an output value from the subtractor and a torque limit value of a second wheel motor and to control a torque of the second wheel motor based on the second torque control value.

2. The apparatus according to claim 1, wherein the first moment generator comprises:
    an error calculator configured to calculate the error between the desired yaw rate and the actual yaw rate of the articulated vehicle;
    a yaw moment generator configured to generate a yaw moment based on the error;
    a first weight generator configured to generate a first weight for moment distribution; and
    a first control moment calculator configured to output the yaw rate control moment calculated by multiplying the yaw moment by the first weight.

3. The apparatus according to claim 2, wherein the error calculator comprises:
    a subtractor configured to calculate the error between the desired yaw rate and the actual yaw rate of the articulated vehicle and to output the calculated error to the yaw moment generator.

4. The apparatus according to claim 2, wherein the yaw moment generator comprises:
    a proportional-integral (PI) controller configured to, when the error between the desired yaw rate and the actual yaw rate of the articulated vehicle is input, generate the yaw moment by performing proportional-integral control based on the error.

5. The apparatus according to claim 2, wherein the first weight generator sets a weight within a range of 0 to 1 based on a hitch angle and the hitch angular velocity of the articulated vehicle, and generates the first weight for moment distribution based on the set weight.

6. The apparatus according to claim 5, wherein, in the generation of the first weight, the first weight generator applies an Equation expressed as First Weight=1−Weight.

7. The apparatus according to claim 1, wherein the second moment generator comprises:
    an amplifier configured to, when the hitch angular velocity of the articulated vehicle is input, amplify a signal corresponding to the hitch angular velocity;
    a second weight generator configured to generate a second weight for moment distribution; and
    a second control moment calculator configured to output the hitch damping control moment calculated by multiplying an output value from the amplifier by the second weight.

8. The apparatus according to claim 7, wherein the second weight generator sets a weight within a range of 0 to 1 based on a hitch angle and the hitch angular velocity of the articulated vehicle and generates the second weight for moment distribution based on the set weight.

9. The apparatus according to claim 8, wherein, in the generation of the second weight, the second weight generator generates the second weight equal to the set weight.

10. The apparatus according to claim 1, wherein the first wheel motor torque controller comprises:
    a first calculator configured, when an output value from the adder and a maximum allowable driving torque corresponding to the first wheel motor are input, to calculate and to output a torque value less than the maximum allowable driving torque; and
    a second calculator configured, when the torque value of the first calculator and a maximum allowable power-generation torque corresponding to the first wheel motor are input, to calculate and to output a torque value less than the maximum allowable power-generation torque.

11. The apparatus according to claim 1, wherein the second wheel motor torque controller comprises:

a third calculator configured, when an output value from the subtractor and a maximum allowable driving torque corresponding to the second wheel motor are input, to calculate and to output a torque value less than the maximum allowable driving torque; and a fourth calculator configured, when the torque value of the third calculator and the maximum allowable power-generation torque corresponding to the second wheel motor are input, to calculate and to output a torque value less than the maximum allowable power-generation torque.

12. A method for controlling articulation of an articulated vehicle in an apparatus for controlling the articulation of the articulated vehicle, the apparatus comprising a processor for controlling the articulation, the method comprising:

confirming, by the processor, whether or not a steering angle and a speed of the articulated vehicle are input;

calculating, by the processor, a desired yaw rate based on the steering angle and the speed of the articulated vehicle when the steering angle and the speed of the articulated vehicle are input;

generating, by the processor, a yaw rate control moment based on an error between the desired yaw rate and an actual yaw rate of the articulated vehicle;

generating, by the processor, a hitch damping control moment based on a hitch angular velocity of the articulated vehicle;

outputting, by the processor, a final moment for controlling the articulation of the articulated vehicle by adding the yaw rate control moment and the hitch damping control moment; and controlling, by the processor, the articulation of the articulated vehicle based on the final moment, wherein the controlling the articulation of the articulated vehicle comprises:

amplifying and outputting a first signal corresponding to the final moment and a second signal corresponding to an input demand torque;

adding and subtracting output values of the amplified first and second signals;

calculating a first torque control value based on an output value, acquired by adding the amplified first and second signals, and a torque limit value of a first wheel motor and then controlling a torque of the first wheel motor; and calculating a second torque control value based on an output value, acquired by subtracting the amplified first and second signals, and a torque limit value of a second wheel motor and then controlling a torque of the second wheel motor.

13. The method according to claim 12, wherein the generating the yaw rate control moment comprises:

calculating the error between the desired yaw rate and the actual yaw rate of the articulated vehicle;
generating a yaw moment based on the error;
generating a first weight for moment distribution; and
outputting the yaw rate control moment calculated by multiplying the yaw moment by the first weight.

14. The method according to claim 12, wherein the generating the hitch damping control moment comprises:

amplifying a signal corresponding to the hitch angular velocity when the hitch angular velocity of the articulated vehicle is input;
generating a second weight for moment distribution; and outputting the hitch damping control moment calculated by multiplying an output value from the amplifier by the second weight.

15. The method according to claim 12, wherein the controlling the torque of the first wheel motor comprises:

when the output value, acquired by adding the amplified first and second signals, and a maximum allowable driving torque corresponding to the first wheel motor are input, calculating and outputting a torque value less than the maximum allowable driving torque; and when the torque value less than the maximum allowable driving torque and a maximum allowable power-generation torque corresponding to the first wheel motor are input, calculating and outputting a torque value less than the maximum allowable power-generation torque.

16. The method according to claim 12, wherein the controlling the torque of the second wheel motor comprises:

when the output value, acquired by subtracting the amplified first and second signals, and a maximum allowable driving torque corresponding to the second wheel motor are input, calculating and outputting a torque value less than the maximum allowable driving torque; and when the torque value less than the maximum allowable driving torque and a maximum allowable power-generation torque corresponding to the second wheel motor are input, calculating and outputting a torque value less than the maximum allowable power-generation torque.

17. A computer on a non-transitory machine-readable recording medium having recorded thereon a program to execute the method according to claim 12.

18. An articulated vehicle comprising:

a sensing device configured to sense a steering angle and a speed of the articulated vehicle; and an apparatus for controlling the articulation of the articulated vehicle based on the sensed steering angle and speed of the articulated vehicle, wherein the apparatus calculates a desired yaw rate based on the steering angle and the speed of the articulated vehicle, generates a yaw rate control moment based on an error between the desired yaw rate and an actual yaw rate of the articulated vehicle, generates a hitch damping control moment based on a hitch angular velocity of the articulated vehicle, outputs a final moment for controlling the articulation of the articulated vehicle by adding the yaw rate control moment and the hitch damping control moment, and controls the articulation of the articulated vehicle based on the final moment, wherein, when the apparatus controls the articulation of the articulated vehicle based on the final moment, the apparatus is configured to:

amplify and output a first signal corresponding to the final moment and a second signal corresponding to an input demand torque;

add and subtract output values of the amplified first and second signals;

calculate a first torque control value based on an output value, acquired by adding the amplified first and second signals, and a torque limit value of a first wheel motor and then control a torque of the first wheel motor; and calculate a second torque control value based on an output value, acquired by subtracting the amplified first and second signals, and a torque limit value of a second wheel motor and then control a torque of the second wheel motor.

* * * * *